United States Patent
Kim

[11] Patent Number: 5,852,965
[45] Date of Patent: Dec. 29, 1998

[54] APPARATUS FOR PRODUCING SOYBEAN MILK AND CURD

[76] Inventor: Hong-Bae Kim, 5-7 Hyunchun-dong, Duckyang-ku, Kyunggi-do, Koyang-shi, Rep. of Korea

[21] Appl. No.: 115,569

[22] Filed: Jul. 14, 1998

[30] Foreign Application Priority Data

Jul. 22, 1997 [KR] Rep. of Korea .................. 1997-34288

[51] Int. Cl.$^6$ .............................. A23C 3/02; A23L 1/20; A23J 1/00; A23J 1/14
[52] U.S. Cl. ................................ 99/281; 99/285; 99/286; 99/288; 99/323.3; 99/331; 99/348; 99/341; 99/510; 99/483; 99/495
[58] Field of Search .............................. 99/509, 510, 511, 99/275, 279–281, 283, 285, 286, 288, 290, 300, 323.3, 331, 341, 348, 452, 453, 456, 460, 468, 483, 485, 495; 426/43, 44, 46, 50, 52, 61, 656, 431, 520, 598; 210/346, 511, 514, 694, 780, 783

[56] References Cited

U.S. PATENT DOCUMENTS

| | | | |
|---|---|---|---|
| 2,517,073 | 8/1950 | Alvarez | 99/286 X |
| 2,827,845 | 3/1958 | Richeson | 99/287 X |
| 3,871,273 | 3/1975 | Hsieh | 99/286 |
| 4,534,283 | 8/1985 | Nakamuta | 99/468 |
| 4,771,681 | 9/1988 | Nagata | 99/453 X |
| 4,817,516 | 4/1989 | Chikarashi | 99/483 |
| 4,996,916 | 3/1991 | Miyawaki et al. | 99/453 |
| 5,058,494 | 10/1991 | Hayashi et al. | 99/483 X |
| 5,109,759 | 5/1992 | Asahara | 99/511 X |
| 5,249,513 | 10/1993 | Ueda | 99/459 X |
| 5,363,753 | 11/1994 | Ueda et al. | 99/453 |
| 5,669,291 | 9/1997 | Kazuyoshi | 99/452 X |
| 5,701,810 | 12/1997 | Nakai | 210/514 X |

Primary Examiner—Timothy F. Simone
Attorney, Agent, or Firm—Merchant, Gould, Smith, Edell, Welter & Schmidt

[57] ABSTRACT

An apparatus for producing soybean milk and curd, which includes an upper body assembly including a retention cup, in which a drive unit adapted to drive a rotating shaft carrying a soybean milling blade, and a control unit are contained, and a cover provided with an electrical connecting adapter. The apparatus also includes a cylindrical lower body having an open upper end closable by the upper body assembly, the cylindrical lower body serving to collect therein soybean milk leached from soybeans being milled, and a dreg barrel assembly including a dreg barrel body adapted to contain soybeans, to be milled, therein, and provided with a sieve serving to allow soybean milk to be discharged from the dreg barrel body while preventing bean-curd dregs from being discharged from the dreg barrel body, and a cap covering an upper end of the dreg barrel body. A heater is disposed in the lower body outside the dreg barrel assembly. The apparatus has a compact construction while being capable of automatizing troublesome and complex processes manually carried out in the production of soybean milk and curd, thereby enabling an easy and convenient production of soybean milk and curd in homes.

10 Claims, 6 Drawing Sheets

APPARATUS FOR PRODUCING SOYBEAN MILK AND CURD

BACKGROUND OF THE INVENTION

1. Field of the Invention

The present invention relates to an apparatus for producing soybean milk and curd, and more particularly to an apparatus for producing soybean milk and curd, which has a compact construction while being capable of automatizing troublesome and complex processes manually carried out in the production of soybean milk and curd, thereby enabling an easy and convenient production of soybean milk and curd in homes.

2. Description of the Prior Art

As well known, soybeans, which are used as a raw material for producing soybean milk and curd, have a protein content ranging from about 37 weight % to about 40 weight %. Although such soybeans are ideal foods as a vegetable protein source in that they are nutritively superior and inexpensive, they exhibit a low rate of intestinal absorption, even after being cooked, because of their hard tissues. For this reason, processed foods, which are produced by appropriately processing soybeans to obtain an enhancement in digestibility and nutrient value, have been preferred. In particular countries such as Korea and Japan, soybean curd is a soybean-processed food which is important in dietary life.

A principle of producing soybean curd will be described in brief. First, soybeans are soaked in water for 5 to 24 hours, so that water penetrates into the tissues of the soybeans. By the water saturated in the tissues of the soaked soybeans, the protein and fat existing in the cells of the soybeans are formed into a colloidal solution. When the soaked soybeans are milled to break their cells, the colloidal solution is released out of the cells. Where an extraction of soybean protein from the colloidal solution is carried out using water, about 90% of the soybean protein is leached. The leached soybean protein contains glycinin in an amount of 80% or more. Glycinin, which is a kind of globulin, is soluble in a dilute salt solution. Meanwhile, since soluble salts such as potassium phosphate are contained in soybeans, it is possible to obtain soybean milk containing rich glycinin as well as fat and carbohydrate by heating a mixture of milled soybeans and water. Such soybean milk is hardly coagulated even when it is heated. However, where a salt harmless to people, such as magnesium chloride or calcium sulphate, is added to soybean milk heated to 70° C. or more, glycinin contained in the soybean milk is coagulated and then deposited. Typically, this coagulated product, which is called "soft soybean curd", is very soft and fragile because it has a water content corresponding to 10 times the water content of dry soybean curd. Where an incompletely-coagulated product, which is obtained as mentioned above, is pressed under the condition in which it is put in a shaping die in a state wrapped in a cloth, thereby removing, from the product, water of a content corresponding to 5 times the water content of dry soybean curd, a white soybean curd product is obtained. Preferably, the produced soybean curd is dipped in water for 2 or 3 hours in order to remove added salts.

A traditional procedure for producing soybean curd is as follows:

A) Soaking: First, soybeans are washed by a water containing no iron to remove foreign matters or other impurities therefrom. Thereafter, the soybeans are soaked in water for about 24 hours in winter season, about 5 to 6 hours in summer season, and about 12 hours in spring and autumn seasons.

B) Milling: After removing moisture from the surfaces thereof, the soaked soybeans are milled using a millstone or mixer, thereby producing a soybean slurry.

C) Boiling and Squeezing: The soybean slurry is poured into a pot and then boiled for about 30 minutes in order to remove a fishy taste peculiar to soybeans. During the boiling, the soybean slurry is well stirred under the condition in which heat applied to the soybean slurry is continuously controlled, in order to prevent foams generated during the boiling of the soybean slurry from overflowing. Thereafter, the soybean slurry is put into a bag made of a hemp cloth and then squeezed, so that it is separated into liquid and solid parts. Thus, soybean milk is obtained. The separated solid is called "bean-curd dregs". After being added with sugar or salt, the soybean milk is drinkable.

D) Coagulating, Pressing, and Shaping: The soybean milk is then cooled to a temperature of 70° to 80° C. A coagulant is then added to the cooled soybean milk, thereby coagulating the soybean milk. After removing an excessive amount of moisture from the coagulated product, soft soybean curd is obtained. Soybean curd may also be obtained by putting the coagulated product into a box, which is a shaping die, prior to a complete coagulation thereof, and pressing the coagulated product under the condition in which the coagulated product is covered with a hemp cloth, thereby removing moisture from the coagulated product. The coagulant, which may be calcium sulphate or magnesium chloride, is added in an amount of 270 to 370 g based on 20 l of soybeans and in a state dissolved in 2 l of water.

E) Cutting, and Removal of Coagulant: The completely-coagulated and shaped soybean curd product is cut into pieces of an appropriate size which are, in turn, dipped in water for 2 or 3 hours in order to completely remove the added coagulant.

The above mentioned traditional method for producing soybean curd products involves troublesome and complex processes which are manually and individually performed. For this reason, it is difficult to obtain products of a uniform quality. Furthermore, much time is taken in this method, resulting in a degradation in efficiency. Accordingly, it has been uncommon to produce soybean curd in homes.

SUMMARY OF THE INVENTION

Therefore, an object of the invention is to provide an apparatus for producing soybean milk and/or soybean curd, which has a time and energy-saving compact configuration capable of achieving an easy, convenient and hygienic production of soybean milk and curd in homes.

In accordance with the present invention, this object is accomplished by providing an apparatus for producing soybean milk and curd, comprising: an upper body assembly including a retention cup, in which drive means adapted to drive a rotating shaft carrying a soybean milling blade at a lower end thereof, and a control unit adapted to control the drive means are contained, and a cover provided with an electrical connecting adapter electrically connected to both the drive means and the control unit; a cylindrical lower body having an open upper end closable by the upper body assembly, the cylindrical lower body serving to collect therein soybean milk leached from soybeans being milled; a dreg barrel assembly including a dreg barrel body adapted to contain soybeans, to be milled, therein, and provided with a sieve serving to allow soybean milk, which is a liquid part of the milled soybeans, to be discharged from the dreg barrel body while preventing bean-curd dregs, which are a solid part of the milled soybeans, from being discharged from the dreg barrel body, and a cap covering an upper end of the dreg barrel body; and heating means disposed in the lower body outside the dreg barren assembly and controlled by the control unit.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
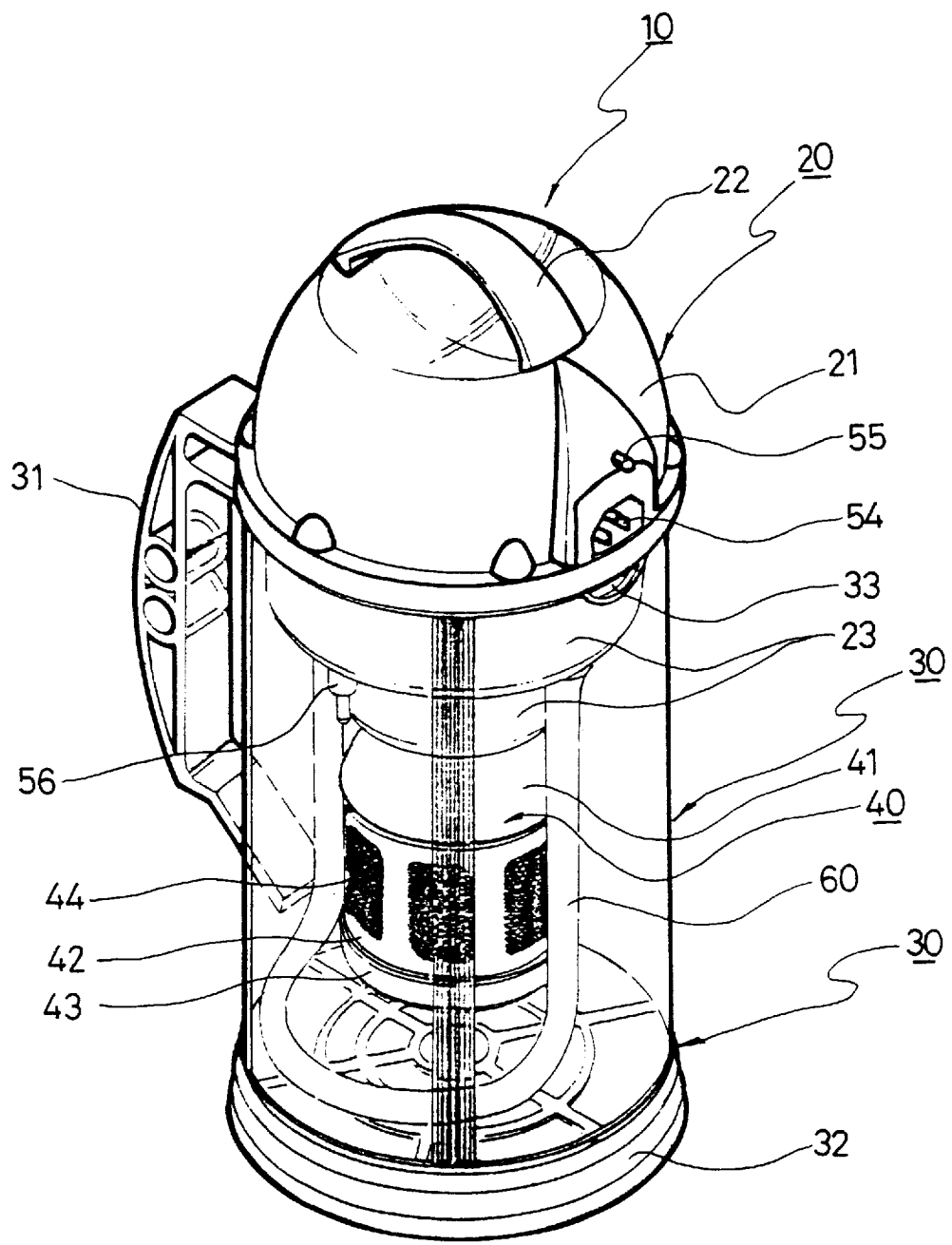
FIG. 1 is a perspective view illustrating a compact type soybean milk/curd producing apparatus according to a preferred embodiment of the present invention.
Figure 2:
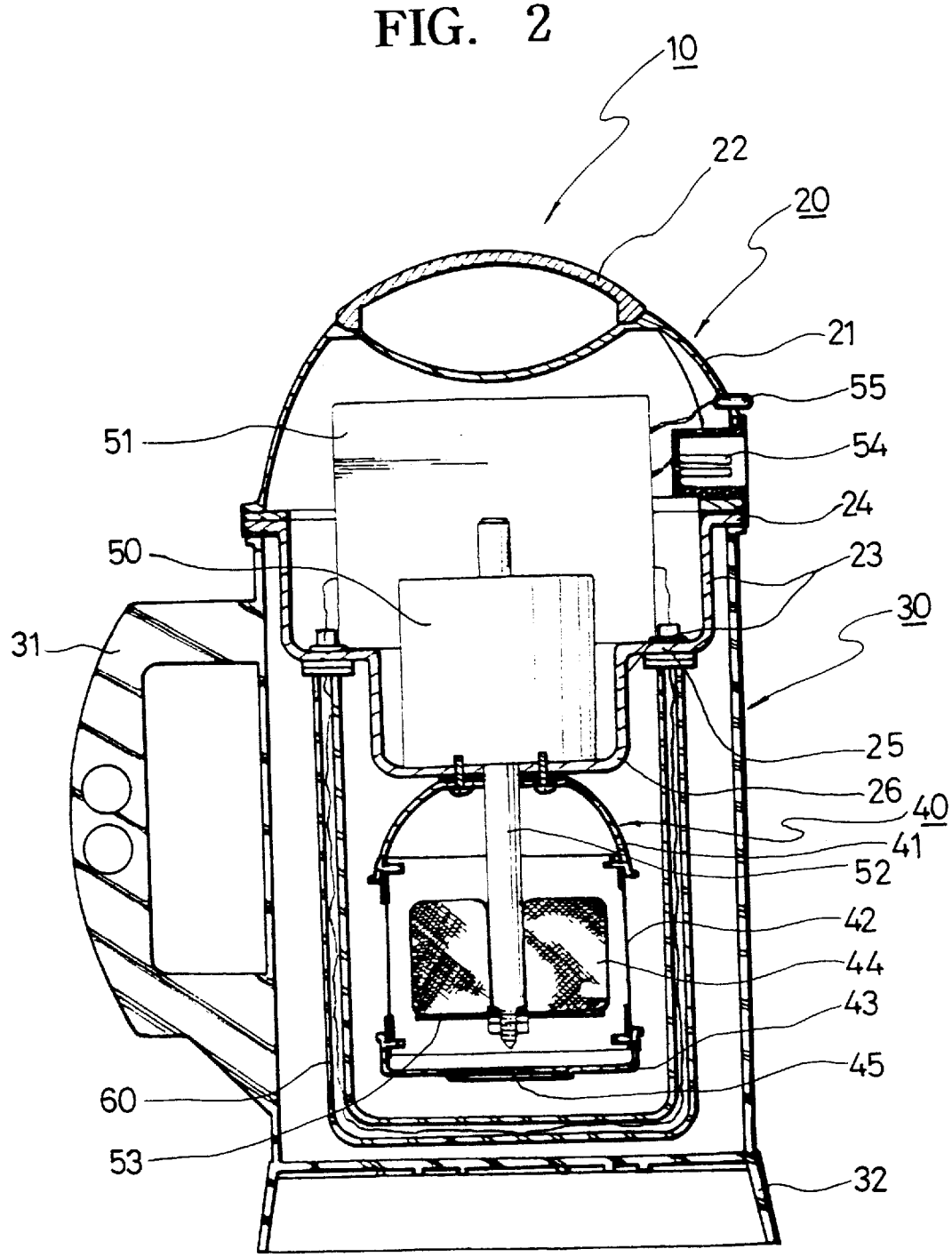
FIG. 2 is a cross-sectional view of the apparatus shown in FIG. 1.
Figure 3:
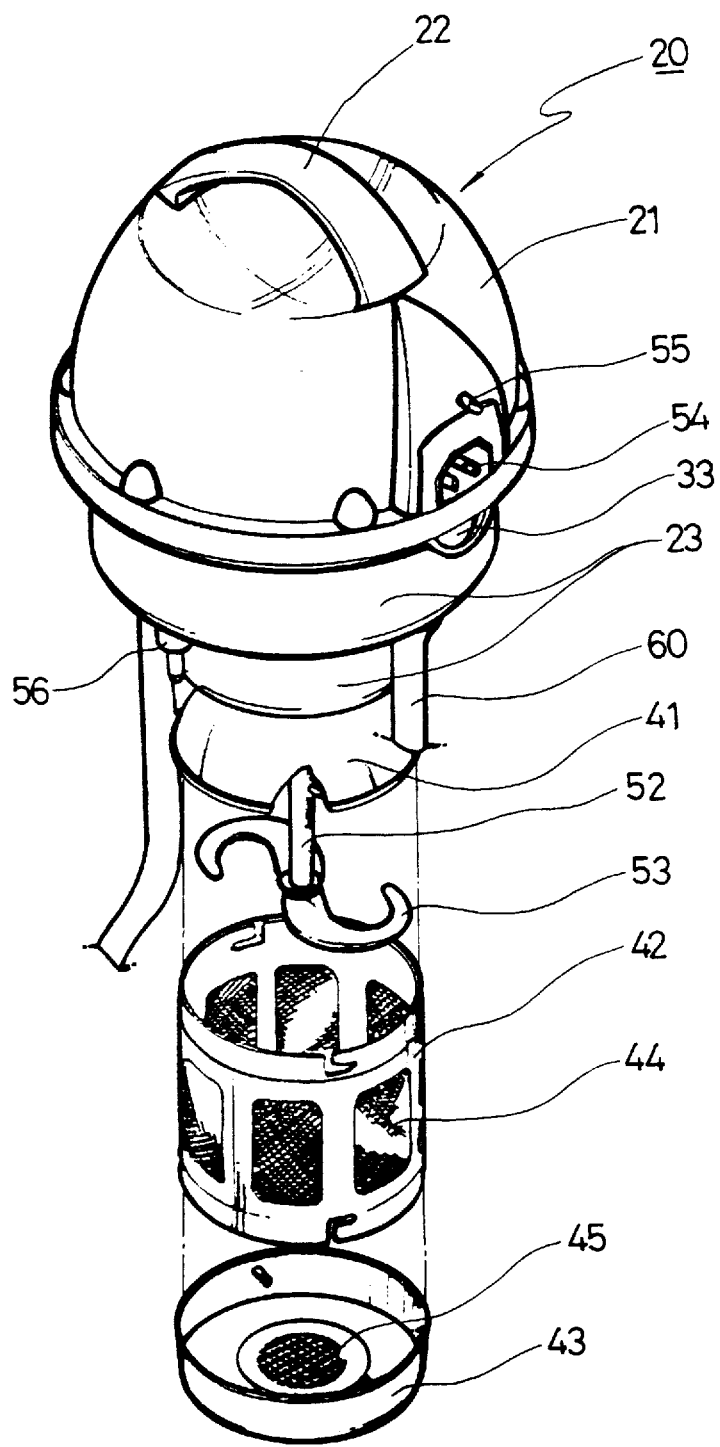
FIG. 3 is an exploded perspective view illustrating essential parts of the apparatus shown in FIG. 1.
Figure 4:
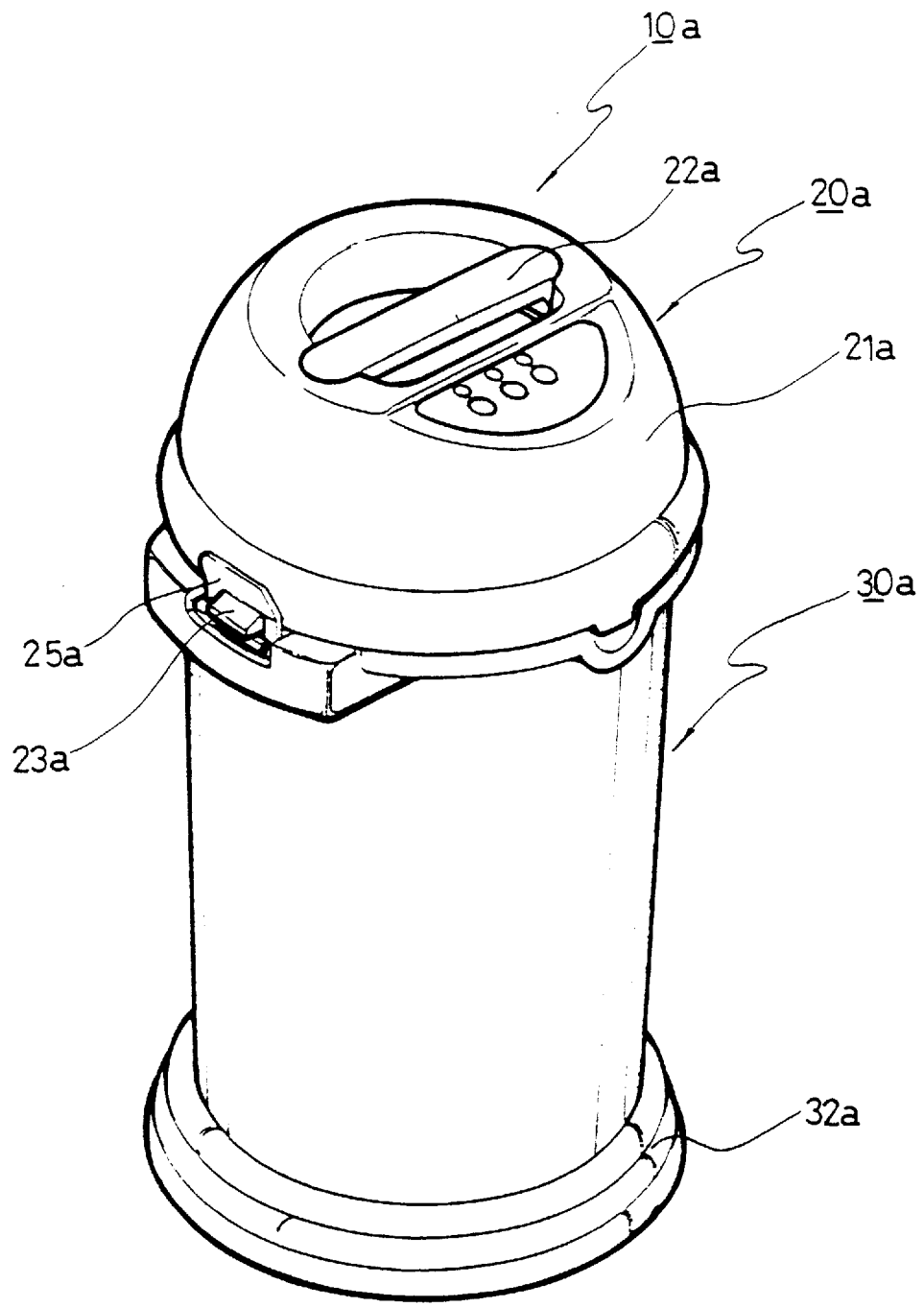
FIG. 4 is a perspective view illustrating a compact type soybean milk/curd producing apparatus according to another preferred embodiment of the present invention.
Figure 5:
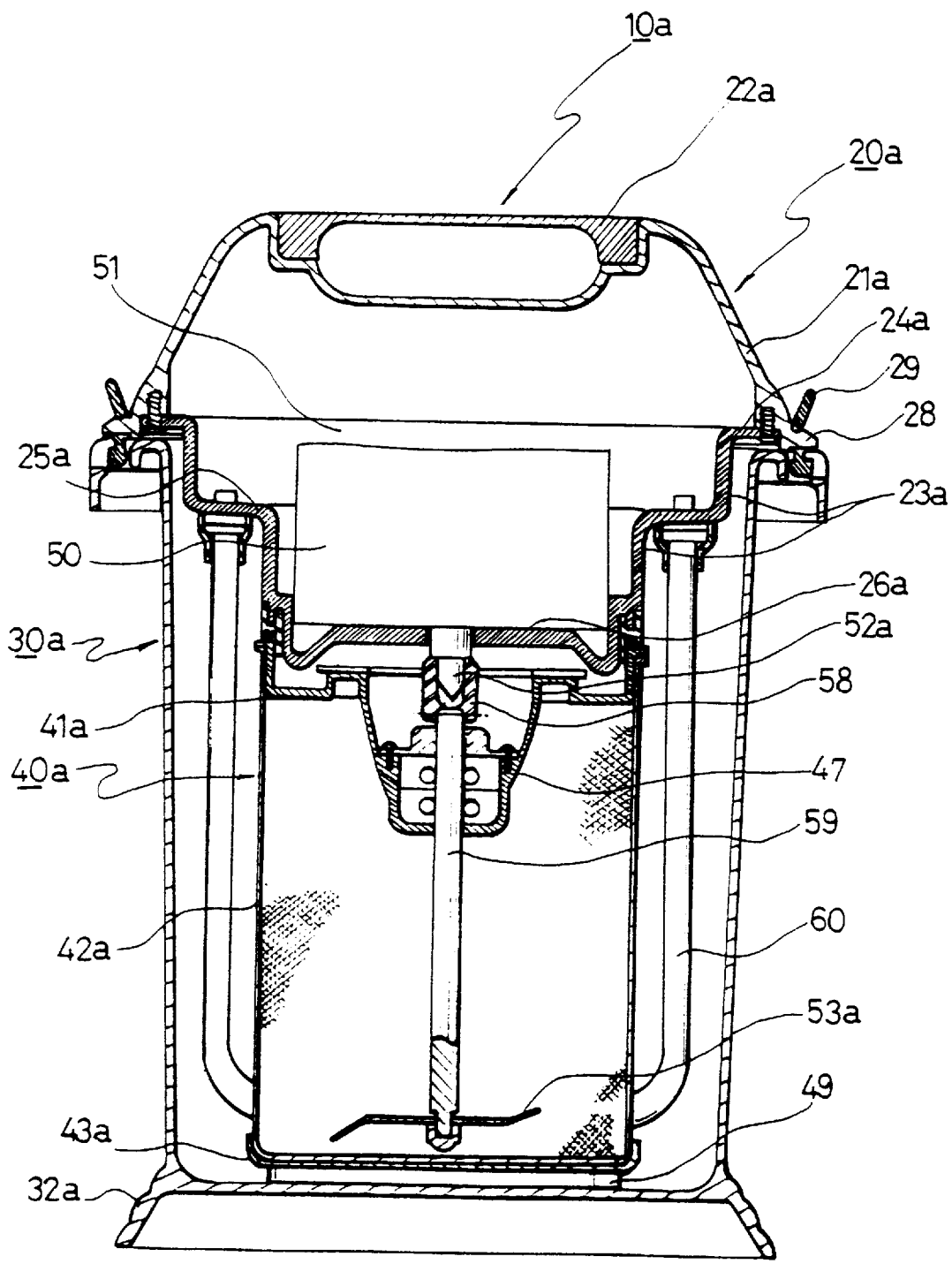
FIG. 5 is a cross-sectional view of the apparatus shown in FIG. 4.
Figure 6:
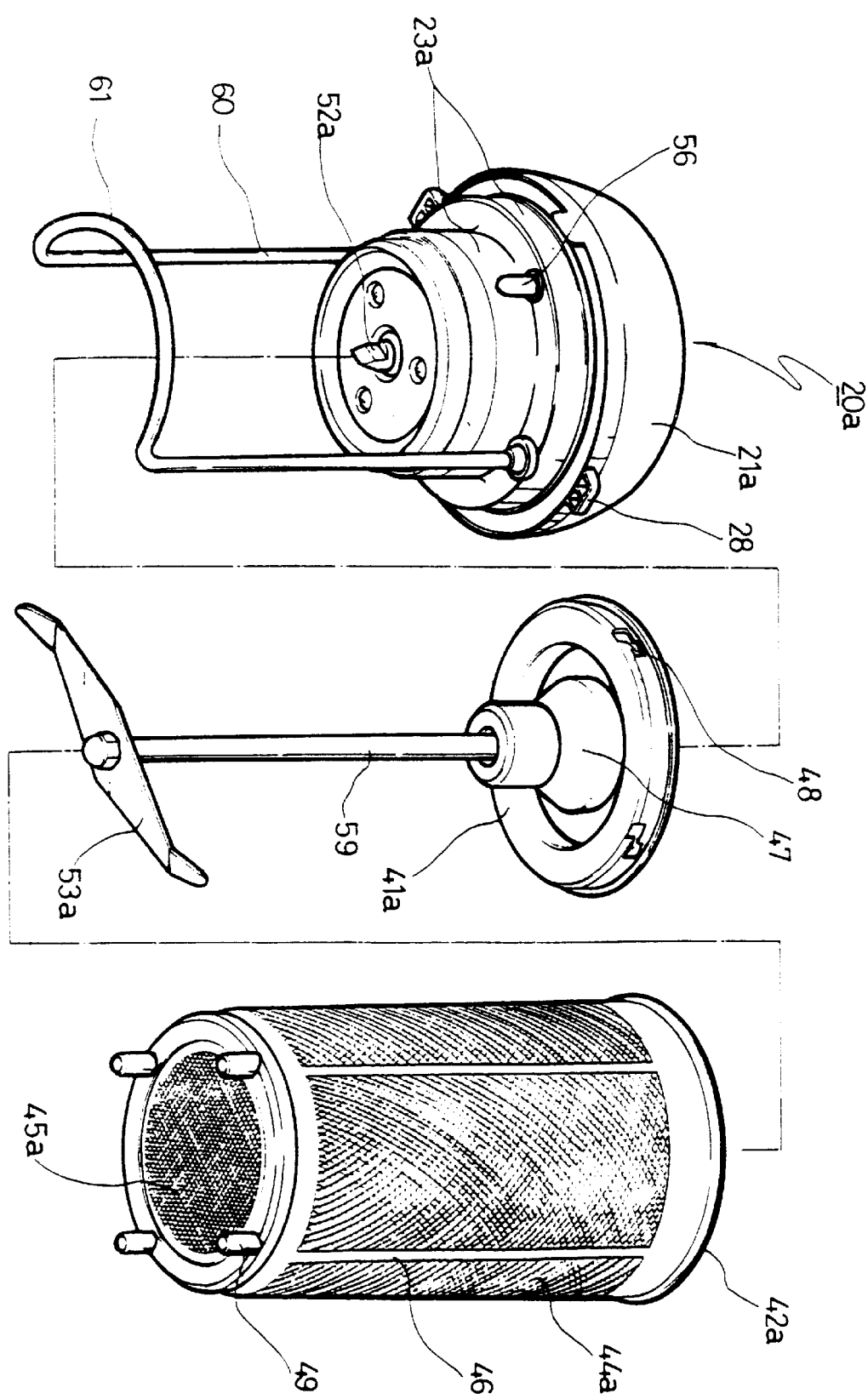
FIG. 6 is an exploded perspective view illustrating essential parts of the apparatus shown in FIG. 4.

FIGS. 1 to 3 illustrate a preferred embodiment of the present invention, respectively, whereas FIGS. 4 to 6 illustrate another preferred embodiment of the present invention, respectively. These embodiments of the present invention have the same basic configuration.

FIG. 1 is a perspective view illustrating a compact type soybean milk/curd producing apparatus 10 according to a preferred embodiment of the present invention whereas FIG. 2 is a cross-sectional view of the apparatus 10 shown in FIG. 1.

As shown in FIGS. 1 and 2, the soybean milk/curd producing apparatus 10 includes an upper body assembly 20, in which a drive means 50 such as a drive motor and a control unit 51 are contained, a lower body 30, a dreg barrel assembly 40 provided with a sieve window 44, a heating means 60 such as a U-shaped heater, and a milling blade 53 mounted on the lower end of a rotating shaft 52 of the drive means 50.

The upper body assembly 20 includes a retention cup 23 for carrying the drive means 50 and control unit 51 therein. The drive means 50 serves to drive the rotating shaft 52 mounted at its lower end with the milling blade 53 serving to mill soybeans. The control unit 51 is stored with a well-known control program for controlling the operation of the control means 50. The upper body assembly 20 also includes a cover 21 on which a power connecting adapter 54 is installed. The power connecting adapter 54 is electrically connected to both the drive means 50 and control unit 51. The cover 21 also carries a power indication lamp 55 thereon. Although the retention cup 23 has no limitation on its shape, it has a stepped construction including two portions having different inner diameters in the case illustrated in FIGS. 1 and 2. As shown in FIGS. 1 and 2, the retention cup 23 is also provided at its upper end with a flange 24 extending radially outwardly from the upper end of the retention cup 23. The flange 24 is coupled to the lower end of the cover 21. An intermediate annular rim 25 is formed between the portions of the retention cup 23 having different inner diameters. The dreg barrel assembly 40 includes a hemispherical fixed cap 41 fixedly mounted on the lower surface of the retention cup 23 by an appropriate fixing means such as set screws. The drive means 50 is fixedly mounted on a bottom portion 26 of the retention cup 23. A through hole is centrally perforated through the bottom portion 26 of the retention cup 23. Through this through hole, the rotating shaft 52 from the drive means 50 extends downwardly in such a manner that it rotates freely. As mentioned above, the hemispherical fixed cap 41 of the dreg barrel assembly 40 is fixed to the bottom portion 26 of the retention cup 23 by a fixing means such as set screws. Of course, the fixing of the hemispherical fixed cap 41 to the retention cup 23 may be achieved using other fixing means or methods. The retention cup 23 serves as a lid for the lower body 30. A grip 22 is formed on the cover 21 having a hemispherical shape. Although not shown, a switch unit may also be mounted on the cover 21.

The lower body 30 has a cylindrical construction being open at an upper end thereof. A grip 31 is formed on a desired portion of the side wall of the lower body 30. A base 32 also extends downwardly from the bottom portion of the lower body 30. However, such a configuration is optional. Preferably, the lower body 30 is made of a transparent resin material. In this case, it is possible to easily monitor the operating state of the soybean milk/curd producing apparatus and the manufacturing procedure carried out by the apparatus. Otherwise, a monitoring window may be provided at a desired portion of the side wall of the lower body 30.

In addition to the fixed cap 41, the dreg barrel assembly 40 includes a dreg barrel body 42 separably coupled to the fixed cap 41 in such a manner that its upper end engages with the lower end of the fixed cap 41, and a bottom plate 43 separably coupled to the dreg barrel body 42 in such a manner that its upper end engages with the lower end of the dreg barrel body 42. A dreg barrel consists of the dreg barrel body 42 and bottom plate 43. In this dreg barrel, soybeans, to be milled, may be received. Sieve windows 44 are formed through the dreg barrel body 42 whereas a sieve window 45 is formed through the bottom plate 43. Sieves are attached to the sieve windows 44 and 45, respectively. When the dreg barrel body 42 is coupled to the fixed cap 41, the milling blade 53 is positioned in the dreg barrel body 42, as described hereinafter. When soybeans contained in the dreg barrel body 42 are milled by a rotation of the milling blade 53, a soybean slurry is formed. This soybean slurry tends to be outwardly discharged from the dreg barrel body 42 by virtue of a centrifugal force generated during the milling. However, the sieves prevent the solid part of the soybean slurry, namely, bean-curd dregs, from being discharged from the dreg barrel body 42 while allowing the liquid part of the soybean slurry, namely, soybean milk, to be discharged from the dreg barrel body 42. As a result, the bean-curd dregs, which may be still in a slurry state, are left in the dreg barrel assembly 40.

The rotating shaft 52, which extends downwardly from the drive means 50 fixed to the retention cup 23 of the upper body assembly 20, passes through central portions of the retention cup 23 and fixed cap 41 so that it is vertically positioned along the central axis of the dreg barrel assembly 40 while being freely rotatable. The milling blade 53 is firmly fixed to the lower end of the rotating shaft 52 by means of a nut and washer. In the illustrated embodiment, the fixed cap 41, dreg barrel body 42 and bottom plate 43 of the dreg barrel assembly 40 have separable constructions, as shown in FIG. 3, in order to achieve an easy washing thereof. However, the elements of the dreg barrel assembly 40 except for the fixed cap 41 may have an integral construction.

For the heating means 60, heaters of optional types may be used. For example, a pipe or plate type heater may be used. However, it is preferred that a U-shaped heater be used, as in the illustrated case, in order to avoid the protein components of soybean milk from getting scorched during a heating operation. In the illustrated case, the U-shaped heater, which extends vertically, is fixed at both ends thereof to the intermediate annular rim 25 of the retention cup 23. Preferably, the U-shaped heater is bent at its lower central portion in a horizontal direction so as to allow an easy coupling and separation of the dreg barrel assembly 40.

Preferably, a foam sensor 56 is also provided. In the illustrated case, the foam sensor 56 is attached to the lower surface of the intermediate annular rim 25 in such a manner that it extends downwardly. Preferably, the foam sensor 56 senses a generation of a certain amount of foam or more from soybean milk, being heated, due to protein contained in a large amount in the soybean milk. A sensing signal from the foam sensor 56 is sent to the control unit 51 which, in turn, controls the supply of electric power to the heating means 60 based on the sensing signal. Thus, it is possible to prevent foam generated during the boiling of the soybean milk from overflowing.

The control unit 51 is designed to operatively connect the drive means 50, heating means 60, and foam sensor 56 together, in order to completely mill soybeans, to efficiently prevent a foam overflow, to prevent soybean milk from getting scorched during its heating, and to minimize the consumption of electric power. Since such a design of the control unit 51 is readily appreciated by those skilled in the art, no further description thereof will be made.

FIG. 4 is a perspective view illustrating a compact type soybean milk/curd producing apparatus 10a according to another preferred embodiment of the present invention whereas FIGS. 5 and 6 are a cross-sectional view and an exploded perspective view of the apparatus 10 shown in FIG. 4, respectively. The apparatus of this embodiment have the same basic configuration as that of FIGS. 1 to 3. Accordingly, only the difference between the apparatus 10 and 10a will be made in the following description. In FIGS. 4 to 6, elements respectively corresponding to those in FIGS. 1 to 3 are denoted by the same reference numerals, but suffixed with "a".

As shown in FIGS. 4 and 5, the soybean milk/curd producing apparatus 10a includes an upper body assembly 20a, in which a drive means 50 such as a drive motor and a control unit 51 are contained, a lower body 30a, a dreg barrel assembly 40a provided with sieve windows 44a, and a heating means 60 such as a U-shaped heater.

The apparatus 10a of this embodiment has an important difference from the apparatus 10 of the above mentioned embodiment in that the dreg barrel assembly 40a has a separable cap 41a, and the drive means 50 has a rotating shaft consisting of a short drive shaft 52a and a long driven shaft 59. The separable cap 41a of the dreg barrel assembly 40a is not fixed to a retention cup 23a of the upper body assembly 20a. The separable cap 41a has a shaft holder 47 for receiving the long driven shaft 59.

The short drive shaft 52a extends downwardly from the drive means 50 which is fixedly mounted on the retention cup 23a of the upper body assembly 20a. The short drive shaft 52a is provided at its lower end with a key, which engages with a mating key formed at the upper end of the long driven shaft 59, in order to transmit a rotating force from the short drive shaft 52a to the long driven shaft 59. This configuration is best shown in FIG. 6. The shaft holder 47 extends downwardly from the central portion of the separable cap 41a included in the dreg barrel assembly 40. A milling blade 53a is mounted on the lower end of the driven shaft 59. The upper portion of the long driven shaft 59 is received in the shaft holder 47 and rotatably supported by a bearing fitted in the shaft holder 47. A cap (denoted by no reference numeral) is arranged over the bearing fitted in the shaft holder 47 in order to provide a seal for the bearing. The cap is sealably mounted on a desired portion of the shaft holder 47 by means of set screws. The upper end of the driven shaft 59 is exposed above the cap. A tube-shaped coupling 58 is fixedly mounted on the upper end of the driven shaft 59 in such a fashion that it surrounds the key formed at the upper end of the driven shaft 59. The lower end of the short drive shaft 52a is separably fitted in the coupling 58 in such a fashion that the key of the drive shaft 52a engages with the key of the driven shaft 59. Those skilled in the art will appreciate that various modifications and substitutions are possible for the configuration associated with the separable rotating shaft. Of course, such modifications and substitutions are within the scope and spirit of the invention.

Since the long driven shaft 59 carrying the blade 53a at its lower end is configured to be integral with the cap 41a of the dreg barrel assembly 40a, it is possible to separably wash the cap 41a alone. In this case, accordingly, there is an advantage in that easy washing and handling can be achieved.

Although not shown clearly, the separable cap 41a extends upwardly at its outer peripheral portion so that it can be coupled to the retention cup 23a of the upper body assembly 20a. This configuration is preferred because it is possible to prevent the dreg barrel assembly 40a from being shifted from its correct position due to rotating vibrations.

Referring to FIG. 6, the dreg barrel assembly 40a includes a dreg barrel body 42a, in addition to the separable cap 41a. As mentioned above, the long driven shaft 59, which carries the blade 53a at its lower end, is rotatably fitted in the shaft holder 47 provided at the separable cap 41a. A plurality of coupling slots 48 are provided at the outer peripheral edge of the separable cap 41a. Although not shown, the dreg barrel body 42a is provided at its upper end with a plurality of protrusions which are engagable with the coupling slots 48 of the separable cap 41a, respectively. The dreg barrel body 42a can be separably coupled to the separable cap 41a by its rotation in a desired direction under the condition in which the protrusions engage with the corresponding coupling slots 48. Preferably, the dreg barrel body 42a has a bottom plate (denoted by no reference numeral) integrally formed therewith. In this case, it is possible to easily wash the dreg barrel body 42a because there is no gap between the dreg barrel body 42a and the bottom plate where dregs may be caught. Both the upper rim (denoted by no reference numeral) of the dreg barrel body 42a and the bottom plate are supported by support bars 46 so that they have a sufficient strength. Sieve windows 44a are defined among the support bars 46. A sieve window 45a is also formed through the bottom plate. Sieves are attached to the sieve windows 44a and 45a, respectively. A plurality of support protrusions 49 are downwardly protruded from the lower surface of the bottom plate. Although not shown, the lower body 30a is provided at its inner bottom surface with a plurality of grooves which receive the support protrusions 49, respectively, when the dreg barrel body 42a is seated on the bottom of the lower body 30a. In this case, it is possible to effectively prevent the dreg barrel assembly 40a from being shifted from its correct position due to rotating vibrations. Although not shown, a pair of grips may be formed on opposite portions of the side wall of the lower body 30a, respectively, in such a fashion that they are symmetric. In this case, it is possible to conveniently and easily carry the lower body 30a upon pouring soybean milk, soft soybean curd, and/or soybean curd from the dreg barrel body 42a to a container.

As in the heating means 60, heaters of optional types may be used for the heating means 60. For example, a pipe or plate type heater may be used. However, it is preferred that a U-shaped heater be used, in order to avoid the protein components of soybean milk from getting scorched during a heating operation. In the illustrated case, the U-shaped heater, which extends vertically, is fixed at both ends thereof to an intermediate annular rim 25a of the retention cup 23a. Preferably, the U-shaped heater is provided at its lower central portion with a semicircular arch portion 61, so as to allow an easy coupling and separation of the dreg barrel assembly 40. The arch portion 61 is formed by bending the lower central portion of the heater 60 by 90° in a horizontal direction.

Two or more protrusions 28 are provided at the lower outer peripheral edge of the cover 21a included in the upper body assembly 20a. Locking members 29, which are mounted on the upper end of the lower body 30a, engage with the protrusions 28, respectively, so that the upper body assembly 20a is firmly coupled to the lower body 30a. Preferably, a foam sensor 56 is also provided. The locking members 29 may have a variety of constructions. Preferably, the locking members 29 comprise bent plate springs.

As apparent from the above description, the apparatus 10a of this embodiment has the following features:

First the long driven shaft 59 driven by the short drive shaft 52a, the blade 53a fixedly mounted to the lower end of the long driven shaft 59, and the cap 41a of the dreg barrel assembly 40a are integral together. The cap 41a is separable without being permanently fixed to the upper body assembly 20a.

Second, the dreg barrel body 42a is integral with its bottom plate. A plurality of support protrusions 49 are provided at the bottom of the dreg barrel body 42a.

In either embodiment of the present invention, it is preferred that a safety function be provided to cut off the supply of electric power to the apparatus 10 or 10a, thereby stopping the entire operation of the apparatus 10 or 10a, when the coupling between the lower body 30 or 30a and the upper body assembly 20 or 20a be released in a state in which electric power is supplied to the apparatus 10 or 10a or when the amount of water contained in the lower body 30 or 30a is less than a predetermined amount. This may be accomplished by providing a configuration in which electric power from an external power supply is supplied to the control unit 51 and drive means 50 via the coupling portions between the lower body 30 or 30a and the upper body assembly 20 or 20a. For the same purpose, the bottom plate included in the dreg barrel assembly may be designed to have a switch function enabling the supply of electric power when it is subjected to a predetermined weight corresponding to a predetermined amount of water contained in the lower body 30 or 30a. For such a safety function, other configurations may be used. Since these configurations are readily appreciated by those skilled in the art, no further description thereof will be made.

Now, a procedure for producing soybean milk, soft soybean curd, and soybean curd using the apparatus of the present invention will be described. For the simplification of description, the following description will be made in conjunction with the apparatus 10a.

Production of Soybean Milk

The procedure for producing soybean milk using the apparatus 10a involves a preparation step (A), a heating step (B), a soybean milling step (C), a re-heating step (D), an alternatingly-repeated milling and heating step (E), a foam sensing and re-heating step (F), a dreg removing step (G), and an additive adding step (H). Now, this procedure will be described in conjunction with these steps, respectively.

(A) Preparation Step

Soybeans are washed to remove foreign matters or other impurities therefrom. Thereafter, the washed soybeans are contained in the dreg barrel body 42a. In this state, the elements of the dreg barrel assembly 40a are assembled together. That is, the separable cap 41a, which carries the long driven shaft 59 attached at its lower end with the blade 53a, is coupled to the dreg barrel body 42a by engaging the coupling slots 48 of the separable cap 41a with the corresponding protrusions of the dreg barrel assembly 40a, respectively. Subsequently, water is contained in the lower body 30a in an amount corresponding to 4 to 12 times the total volume of the soybeans contained in the dreg barrel assembly 40a. In this state, the dreg barrel assembly 40a contained with the soybeans is centrally positioned in the lower body 30a. The upper body assembly 20a is then coupled to the lower body 30a. As mentioned above, the upper body assembly 20a includes the retention cup 23a, in which the drive means 50 and the control unit 51 adapted to control the drive means 50 are contained, and the cover 21a on which a power connecting adapter 54 is installed. The power connecting adapter 54 is electrically connected to both the drive means 50 and control unit 51. In this state, the dreg barrel assembly 40a is coupled to the retention cup 23a in such a manner that its upper end engages with the lower end of the retention cup 23a. Thereafter, the apparatus 10a is electrically connected to an external power supply.

(B) Heating Step

The water contained the lower body 30a is boiled for 1 to 10 minutes by an operation of the heating means 60. This step is necessary to allow the skins of the soybeans to be easily peeled off, to gelatinize the starch contained in the soybeans, to allow water to penetrate sufficiently into the cells of the soybeans, thereby causing the protein and fat existing in the cells of the soybeans to be formed into a colloidal solution, and to allow the cells of the soybeans to be easily broken.

(C) Soybean Milling Step

The soybeans contained in the dreg barrel assembly 40a are milled by driving the drive means 50 for one second to 2 minutes. During the milling, a soybean slurry is formed. The liquid part of the soybean slurry, namely, soybean milk, is forcibly circulated through the sieves attached to the sieve windows 44a and 45a by virtue of a centrifugal force generated due to the generation of a vortex flow during the milling. Thus, the soybean milk is rendered to be homogeneous. However, the solid part of the soybean slurry, namely, bean-curd dregs, can not pass through the sieves. As a result, the bean-curd dregs are left in the dreg barrel assembly 40a.

(D) Re-heating Step

Immediately after the driving of the drive means 50 is stopped, the soybean milk is re-heated for one second to 5 minutes by the heating means 60 which is disposed in the lower body 30a outside the dreg barrel assembly 40a and controlled by the control unit 51. The reason why the driving of the driven means 50 is stopped is to settle down suspended soybean fragments incompletely milled. At the subsequent repeated milling step, the settled-down soybean fragments will be completely milled. Preferably, steps (C) and (D) are alternatingly carried out, in order to achieve a reduction in the loss of electric power.

(E) Alternatingly-Repeated Milling and Heating Step

The soybean milling step (C) and re-heating step (D) are repeatedly carried out 3 to 8 times, in order to achieve a complete milling of soybeans, thereby achieving a sufficient leaching of soybean milk. In the re-heating step, it is important to prevent foam generated due to protein contained in the soybean milk from overflowing.

(F) Foam Sensing and Re-Heating Step

Although the driving of the blade 53a is completed after the alternatingly-repeated milling and heating step (E), foam is continuously formed because the re-heating step (D) is continued for 3 to 30 minutes. When the foam sensor 56 senses a predetermined amount of foam, the operation of the heating means 60 is automatically stopped. The heating means 60 operates continuously unless a predetermined amount of foam is sensed. Accordingly, it is possible to prevent a foam overflow.

(G) Dreg Removing Stop

After the completion of step (F), the user disconnects a power cord (not shown) of the apparatus 10a from the external power supply. The user may recognize the completion of step (F) by a buzzer sound or flickering lamp light generated upon the completion of step (F). Thereafter, the user carefully removes the upper body assembly 20a from the apparatus 10a and then lays the dreg barrel assembly 40a on the upper body assembly 20a in an inclined state, so as to completely discharge a residue of soybean milk from the dreg barrel assembly 40a.

(H) Additive Adding Step

This step is optional. Although the soybean milk obtained at step (G) is drinkable as it is, an additive, such as sugar, salt, and spice, may be added in a desired amount to the soybean milk in accordance with the user's preference. The user also may drink the soybean milk after adding ground peanuts, pine nuts, or ground pine nuts to the soybean milk in accordance with his preference.

Production of Soft Soybean Curd

Following the preparation step (A), heating step (B), soybean milling step (C), re-heating step (D), alternatingly-repeated milling and heating step (E), foam sensing and reheating step (F), and dreg removing step (G), a protein coagulating step (I) is carried out.

(I) Protein Coagulating Step

A coagulant, which is one or more selected from the group consisting of magnesium chloride, calcium sulphate, magnesium sulphate, and calcium chloride, is added to the soybean milk in a solution state in which the coagulant is dissolved in water in a rate of 0.5 to 10 g based on 1 l of water. After the addition, the soybean milk is kept in a settled state for 5 to 30 minutes. Thus, soft soybean curd is produced.

Production of Soybean Curd

After completing the preparation step (A), heating step (B), soybean milling step (C), re-heating step (D), alternatingly-repeated milling and heating step (E), foam sensing and re-heating step (F), and dreg removing step (G), the following steps are carried out.

(I') Partial Protein Coagulating Step

A coagulant, which is one or more selected from the group consisting of magnesium chloride, calcium sulphate, magnesium sulphate, and calcium chloride, is added to the soybean milk in a solution state in which the coagulant is dissolved in water in a rate of 0.5 to 10 g based on 1 l of water. After the addition, the soybean milk is kept in a settled state for 3 to 10 minutes.

(J) Soybean Curd Shaping Step

A cloth is laid on the inner surface of a shaping die. The partially coagulated soybean milk product obtained at step (I') is then put into the shaping die. After being completely wrapped in the cloth, the coagulated product is downwardly pressed using a pressing plate for 5 minutes or more, thereby removing moisture from the coagulated product.

(K) Soybean Curd Removing Step

After sequentially removing the pressing plate and shaping die, the shaped soybean curd is removed from the cloth.

As apparent from the above description, the present invention provides an apparatus for producing soybean milk and curd, which has a compact construction while being capable of automatizing troublesome and complex processes manually carried out in the production of soybean milk and curd, thereby enabling an easy and convenient production of soybean milk and curd in homes.

In accordance with the apparatus of the present invention, soybeans contained in the dreg barrel assembly are milled by a rotation of the blade, thereby forming a soybean slurry. The liquid part of the soybean slurry, namely, soybean milk, forms a vertex flow, so that it is forcibly circulated through the sieves attached to the sieve windows during the milling. Accordingly, it is possible to increase the protein concentration in the soybean milk. Since the solid part of the soybean slurry, namely, bean-curd dregs, are left in the dreg barrel assembly, the removal of the bean-curd dregs can be easily carried out. The heating of soybean milk is controlled by the foam sensor. Accordingly, it is possible to effectively and automatically prevent foam generated due to protein contained in a large amount in the soybean milk from overflowing. In addition, a direct heating configuration is used in accordance with the present invention. Accordingly, an improvement in thermal efficiency is obtained. Although there is a possibility that soybean milk get scorched due to its direct contact with the heater, this possibility is completely and simply eliminated in accordance with the use of a pre-heating time. Furthermore, there is an advantage in terms of sanitation because the soybean curd procedure carried out by the apparatus of the present invention involves a reduced number of steps requiring a manual handling.

Since the apparatus of the present invention has a simple configuration, it is possible to achieve an inexpensive and efficient soybean milk/soybean curd production.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for producing soybean milk and curd, comprising:

an upper body assembly including a retention cup, in which drive means adapted to drive a rotating shaft carrying a soybean milling blade at a lower end thereof, and a control unit adapted to control the drive means are contained, and a cover provided with an electrical connecting adapter electrically connected to both the drive means and the control unit;

a cylindrical lower body having an open upper end closable by the upper body assembly, the cylindrical lower body serving to collect therein soybean milk leached from soybeans being milled;

a dreg barrel assembly including a dreg barrel body adapted to contain soybeans, to be milled, therein, and provided with a sieve serving to allow soybean milk, which is a liquid part of the milled soybeans, to be discharged from the dreg barrel body while preventing bean-curd dregs, which are a solid part of the milled soybeans, from being discharged from the dreg barrel body, and a cap covering an upper end of the dreg barrel body; and heating means disposed in the lower body outside the dreg barren assembly and controlled by the control unit.

2. The apparatus according to claim 1, wherein the rotating shaft comprises a short drive shaft included in the drive means, and a long driven shaft separably coupled to the short drive shaft and driven by a rotation of the long driven shaft.

3. The apparatus according to claim 2, wherein the blade is fixed to one end of the long driven shaft, and a portion of the long driven shaft disposed adjacent to the other end of the long driven shaft is rotatably fitted in a shaft holder extending downwardly from a central portion of the cap included in the dreg barrel assembly, whereby the long driven shaft is separable from the upper body assembly, along with the cap of the dreg barrel assembly.

4. The apparatus according to claim 2, wherein a rotating force from the short drive shaft is transmitted to the long driven shaft via a coupling adapted to couple adjacent ends of the short drive shaft and long driven shaft.

5. The apparatus according to claim 3, wherein the shaft holder is sealably formed.

6. The apparatus according to claim 1, wherein the heating means comprises a U-shaped heater fixed at both ends thereof to a desired portion of the retention cup, the U-shaped heater being provided at a central portion thereof with an arch portion parallel to a bottom of the retention cup.

7. The apparatus according to claim 1, wherein the cap of the dreg barrel assembly is fixed to a bottom of the retention cup of the upper body assembly.

8. The apparatus according to claim 1, further comprising:

a foam sensor mounted on a desired portion of the retention cup included in the upper body assembly.

9. The apparatus according to claim 1, further comprising:

a grip formed on the cover of the upper body assembly.

10. The apparatus according to claim 1, wherein the lower body assembly is made of a transparent resin material, and the lower body assembly is provided with one or two grips at a side wall thereof.

* * * * *